United States Patent

[11] 3,552,694

| [72] | Inventor | William G. Flannelly<br>South Windsor, Conn. |
|---|---|---|
| [21] | Appl. No. | 808,224 |
| [22] | Filed | Mar. 18, 1969 |
| [45] | Patented | Jan. 5, 1971 |
| [73] | Assignee | Kaman Corporation<br>Bloomfield, Conn.<br>a corporation of Connecticut |

[54] THREE-DIMENSIONAL VIBRATION ISOLATOR
7 Claims, 12 Drawing Figs.

[52] U.S. Cl. ................................................. 248/20,
188/1; 248/358
[51] Int. Cl. .................................................. F16f 1/22
[50] Field of Search .......................................... 248/20, 21,
22, 15, 18, 358, 24; 267/(Inquired); 188/1B

[56] References Cited
UNITED STATES PATENTS

| 2,706,606 | 4/1955 | Allen | 248/20 |
| 3,110,464 | 11/1963 | Baratoff et al. | 248/20 |
| 3,322,379 | 5/1967 | Flannelly | 248/358X |
| 3,445,080 | 5/1969 | Flannelly | 248/20 |

Primary Examiner—Roy D. Frazier
Assistant Examiner—J. Franklin Foss
Attorney—Mc Cormick, Paulding and Huber ABSTRACT: The disclosure is of a passive vibration isolator for reducing the transmission of vibratory displacements and forces from a vibrationally excited base or body to an isolated body. The excited body is one which may vibrate in three orthogonal directions either independently or simultaneously. The isolated body is connected with the excited body by a spring means which statically supports it and permits the excited body to move resiliently relative to it in the three orthogonal directions. Also, between the excited body and the isolated body are two weighted levers which are so pivotally connected to the bodies and to one another as to produce inertial forces which counteract the forces produced by the vibration of the excited body and thereby reduce, in all three directions of relative movement, the vibratory forces transmitted to the isolated body from the excited body.

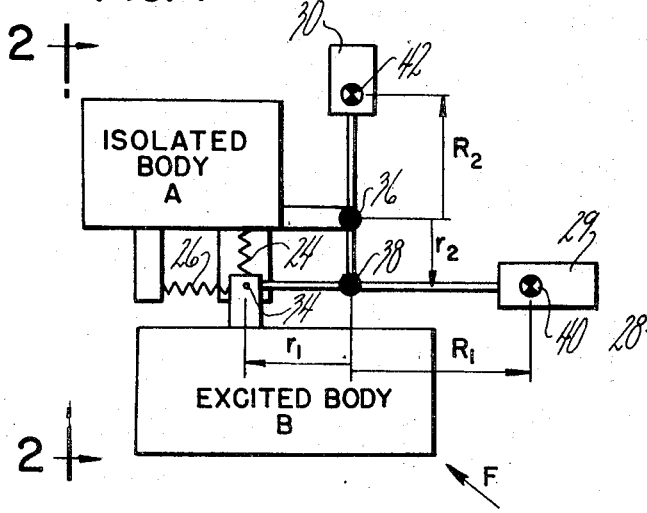
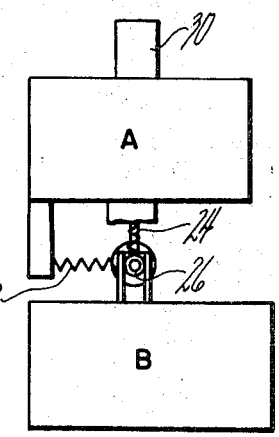
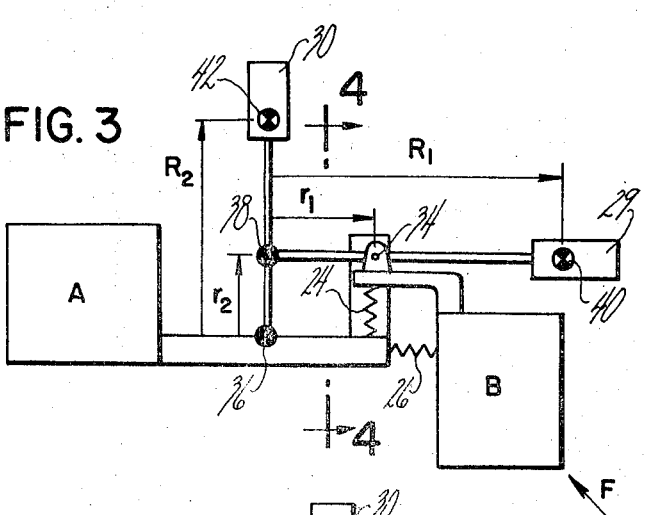
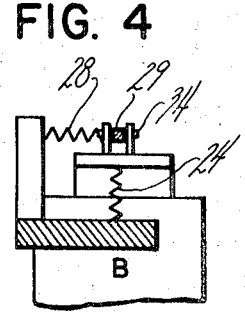
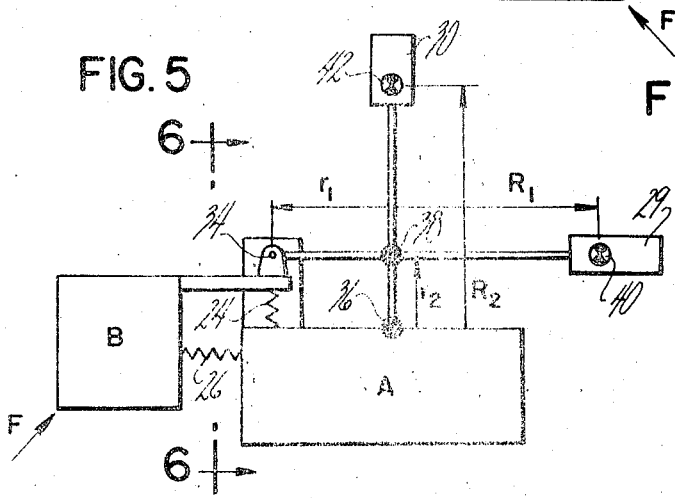
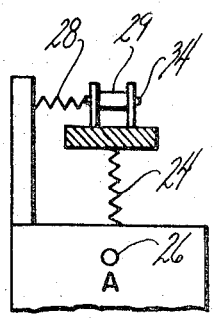
INVENTOR.
WILLIAM G. FLANNELLY

3,552,694
FIG. 7
FIG. 8
FIG. 9
FIG. 10
FIG. 11
FIG. 12
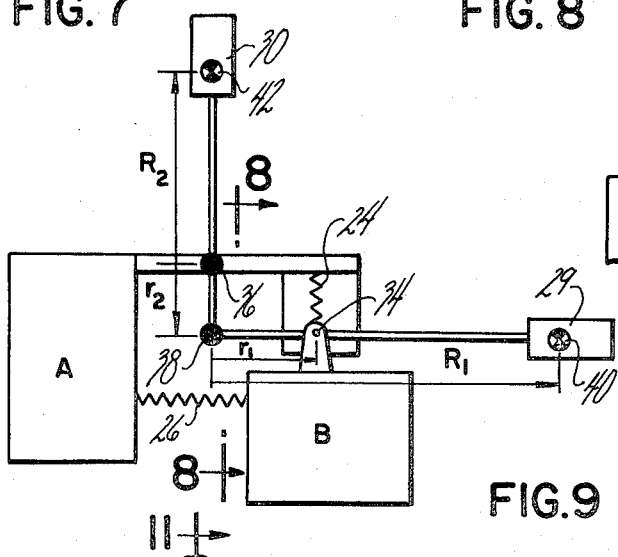
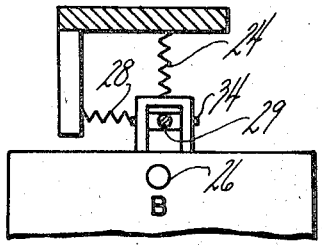
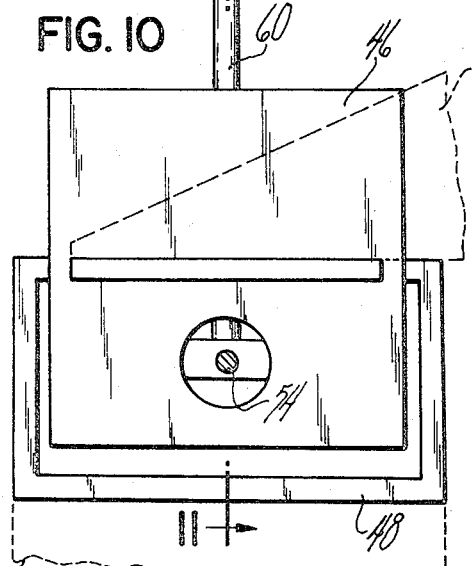
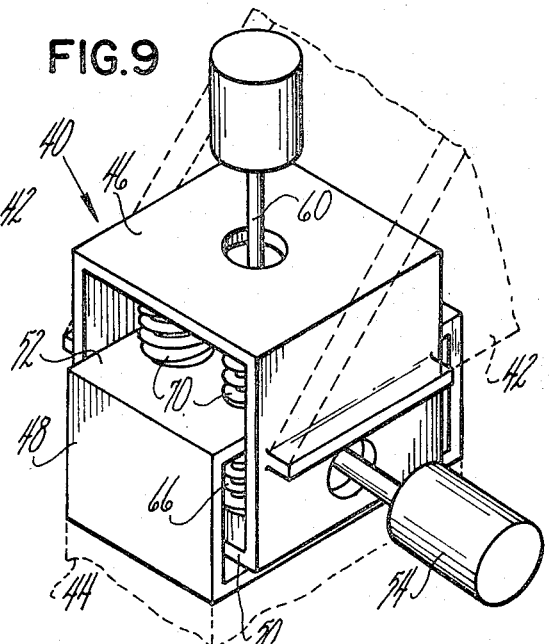
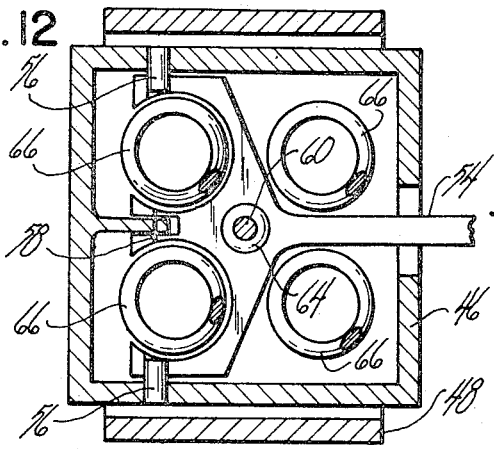
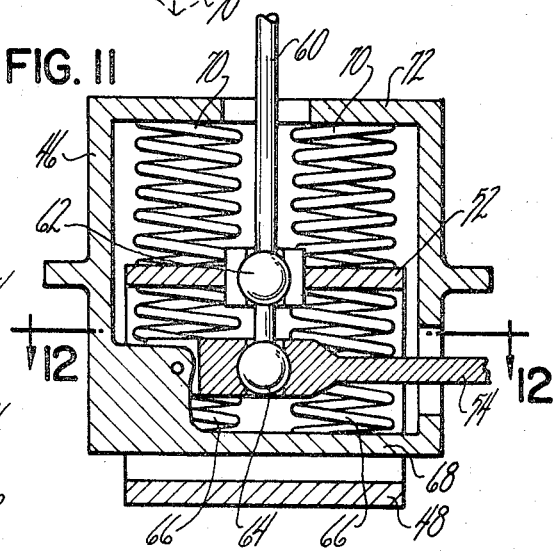

THREE-DIMENSIONAL VIBRATION ISOLATOR

CROSS-REFERENCE TO RELATED APPLICATIONS

The vibration isolator of this application is related to the vibration isolators disclosed in U.S. Pat. No. 3,322,379 for Dynamic Antiresonant Vibration Isolator and in copending application Ser. No. 641,540, filed May 26, 1967, now U.S. Pat. No. 3,445,080 Antiresonant Vibration Isolator. The isolators of said patent and copending application are devices utilizing a dynamic antiresonant effect to reduce the transmission of vibratory forces between two bodies and occurring in one direction of movement of the excited body. The vibration isolator of this application utilizes substantially the same dynamic effect explained in said patent and copending patent application, but is an improvement thereon insofar as it is capable of isolating vibratory forces or movements of the isolated body occurring in any one of three orthogonal directions either independently or simultaneously.

BACKGROUND OF THE INVENTION

This invention relates to vibration isolators, and deals more particularly with a passive vibration isolator consisting primarily of a system of springs and masses arranged and interconnected with one another and with the excited and isolated bodies to produce a substantially zero or very low transmissability of vibratory forces or displacements between the bodies in three orthogonal directions of relative movement at a given tuned or antiresonant frequency for each direction, which antiresonant frequency is usually a relatively low frequency, and to also produce a desirably reduced transmissability in all three directions over a relatively wide range of frequencies. As mentioned above, the prior vibration isolators disclosed in U.S. Pat. No. 3,322,379 and in copending application Ser. No. 641,540, are capable of effectively eliminating or reducing the transmission of vibratory forces and displacements from an excited body to an isolated body occurring in one direction of movement of the excited body. In many instances, however, the vibration of the excited body occurs in two or more orthogonal directions simultaneously. Therefore, the object of this invention is to provide a vibration isolator utilizing the dynamic principles of the stated prior isolators, but capable of effectively isolating or reducing vibrations occurring in any one of three coordinate orthogonal directions.

SUMMARY OF THE INVENTION

This invention resides in a passive vibration isolator wherein a mass system is located between the excited and isolated bodies which in each of three orthogonal directions of movement of the excited body relative to the isolated body produces inertial forces which counteract spring forces occurring in such direction produced by a spring means also located between the two bodies and forming a part of the isolator. The spring means is such as to produce, in each of the three orthogonal directions of movement of the excited body relative to the isolated body, an elastic restoring force on the excited body tending to return it to its neutral or at rest position. The mass system consists basically of two weighted levers, one pivotally connected to the excited body for pivotal movement about a pivot axis fixed relative to the excited body, the other connected to the isolated body for universal movement about a point fixed relative to the isolated body, and both connected to one another for relative universal movement about a point fixed relative to both.

BRIEF DESCRIPTION OF THE DRAWINGS

FIG. 1 is a side elevational view showing somewhat schematically a vibration isolator embodying this invention.

FIG. 2 is a fragmentary end elevational view taken on the line 2–2 of FIG. 1.

FIG. 3 is a side elevational view showing somewhat schematically a vibration isolator comprising another embodiment of this invention.

FIG. 4 is a fragmentary transverse sectional view taken on the line 4–4 of FIG. 3.

FIG. 5 is a side elevational view showing somewhat schematically a vibration isolator comprising another embodiment of this invention.

FIG. 6 is a fragmentary sectional view taken on the line 6–6 of FIG. 5.

FIG. 7 is a side elevational view showing somewhat schematically a vibration isolator comprising another embodiment of this invention.

FIG. 8 is a fragmentary sectional view taken on the line 8–8 of FIG. 7.

FIG. 9 is a perspective view of an actual isolator embodying this invention.

FIG. 10 is a side elevational view of the isolator of FIG. 9.

FIG. 11 is a vertical sectional view taken on the line 11–11 of FIG. 10.

FIG. 12 is a horizontal sectional view taken on the line 12–12 of FIG. 11.

DESCRIPTION OF THE PREFERRED EMBODIMENTS

The vibration isolator of this invention is intended to eliminate or reduce the transmission of vibratory forces and displacements between two bodies resulting from movement of one body in three orthogonal directions relative to the body. For the purpose of this description, and in the claims which follow, the body which vibrates is referred to as the "excited body" and in all of the drawings forming a part hereof has been designated body "B". Likewise, the body which is to be isolated from the vibratory movements of the excited body, is referred to as the "isolated body" and in the drawings is designated body A.

In accordance with the invention, and as explained in more detail hereinafter, the isolated body is supported from the excited body by a spring means which statically supports the isolated body while nevertheless permitting the excited body to move resiliently in three orthogonal directions relative to it. That is, when the excited body is at rest, the spring means holds the isolated body at a given neutral position relative thereto, and when the excited body is moved in any one of three orthogonal directions relative to the isolated body, the spring means permits such movement while nevertheless exerting an elastic-restoring force on the excited body tending to return it to its neutral position. The isolator further includes an auxiliary mass system between the two bodies which is mechanically coupled with the two bodies so as to dynamically respond to relative movements therebetween in such a manner as to produce inertial forces opposing those which would otherwise be transmitted from the excited body to the isolated body. This auxiliary mass system is comprised of two massive members connected to said two bodies and to one another, with their pivot axes and centers of gravity so arranged, that in each direction of movement of the excited body relative to the isolated body an isolating action is produced similar to that described in the aforementioned patent or patent application. The massive members may take various different shapes and forms without departing from the spirit of this invention. Since they are essentially pivotally movable members, they are referred to herein for convenience as "massive levers," or simply "levers." It is to be understood, however, that these terms are used in a broad sense and should be interpreted to include any pivotally moving member having a mass sufficiently significant in comparison to the mass of the excited and isolated bodies as to produce a practical isolating effect.

In further accordance with the invention, one of the massive levers of the auxiliary mass system is pivotally connected to the excited body for movement about a pivot or hinge axis fixed relative to the excited body. The other lever of the system is connected to the isolated body for universal pivotal movement about a point fixed relative to the isolated body and is also connected with the first lever for universal pivotal movement about another point fixed relative to both of the levers. The first lever serves to isolate or reduce the transmission of vibrations occurring in one of the three orthogonal directions of relative movement and the second lever serves to isolate or reduce the transmission of vibrations occurring in the other two orthogonal directions of relative movement.

The dynamic effect or response of each weighted lever, as explained in the aforementioned patent and patent application, is dependent, among other things, on the relative locations of its two pivot axes and its center of gravity. Further, two basically different arrangements of these points may be used for each lever. That is, if the point at which the lever is connected to the isolated body is taken as the reference point, the displacement of the center of gravity of the lever from this reference point is designated R, the displacement of the pivot point between the excited body and the lever from this reference point is designated r, and the direction of displacement of the center of gravity from this reference point is taken as the positive direction, then these points may be arranged so that the quantity R/r is either a negative number or a positive number. In a device of this invention, the arrangement may be such that both of the weighted levers have a positive R/r characteristic, so that both have a negative R/r characteristic, or so that one has a positive R/r characteristic and the other a negative R/r characteristic.

Turning to the drawings in more detail, FIGS. 1 through 8 show somewhat schematically four different isolators embodying this invention and utilizing four different combinations of Rr characteristics for their two levers. FIGS. 1 and 2 show an isolator wherein both of the levers have a negative R/r characteristic. FIGS. 3 and 4 show an isolator wherein both of the levers have a positive R/r characteristic. FIGS. 5 and 6 show an isolator wherein the first lever has a positive R/r characteristic and the second lever a negative R/r characteristic, and FIGS. 7 and 8 show an isolator wherein the first lever has a negative R/r characteristic and the second lever a positive Rr characteristic.

In the four isolators shown in FIGS. 1 to 8, the corresponding parts of the different isolators have been given, for convenience, the same reference numbers. Referring first to FIGS. 1 and 2, the isolated body is indicated at A and the excited body at B. The arrow F indicates a vibratory force which is applied in the direction of the arrow to the excited body to cause it to vibrate relative to the isolated body with components of movement in three different orthogonal directions, one of which is the vertical direction and the other two of which are a horizontal direction in the plane of FIG. 1 and another horizontal direction perpendicular to the plane of FIG. 1. The FIGS. show the two bodies in their at rest or neutral positions. The spring means between the two bodies comprises a first spring 24 for resiliently resisting vertical movement of the excited body 22 relative to the isolated body, a second spring 26 for resiliently resisting horizontal movement of the excited body relative to the isolated body in the plane of the paper in FIG. 1 and a third spring 28 for resiliently resisting horizontal movement of the excited body relative to the isolated body in a plane perpendicular to the paper in FIG. 1. The two weighted levers of the auxiliary mass system are shown at 29 and 30, respectively. The first lever 29 is pivotally connected to the excited body B for pivotal movement about a pivotal or hinge axis 34 fixed relative to the excited body. The second lever 30 is connected to the isolated body A by a spherical bearing, Hooke's joint or other universal connecting means for universal movement relative to the body A about a point 36 fixed relative to the body A. The two levers 29 and 30 are in turn connected to one another by another spherical bearing, Hooke's joint or the like for universal movement about a point 38 fixed relative to both levers. The center of gravity of the first lever 29 is indicated at 40 and the center of gravity of the second lever 30 is indicated at 42. Preferably and as shown, The pivot points and center of gravities are so arranged that when the bodies are at rest, the pivot axis 34, the pivot point 38, and the center of gravity 40 of the first lever are located along a common horizontal line and the pivot points 38 and 36 and the center of gravity 42 of the second lever are located along a common vertical line.

The first lever 29 serves to isolate the body A from the excited body B with regard to movements of the excited body B occurring in the vertical direction. That is, if the excited body B moves only in the vertical direction, the second bar 30 remains stationary and the first bar 29 pivots about the axis 34 and the point 38 to produce an isolating action similar to that described in U.S. Pat. No. 3,322,379. The pivot point 38, therefore, constitutes the connection between the first lever 29 and the isolated body and serves as the reference point for determining the nature of the R/r characteristic. That is, as shown in FIG. 1, the center of gravity 40 is located the distance $R_1$ in one direction from the pivot point 38 and the pivot axis 34 is displaced the distance $r_1$ in the opposite direction from the pivot point 38 so that the R/r characteristic of the first lever 29 is $-R_1/r_1$.

The second weighted lever 30 in FIG. 1 serves to isolate the body A from the excited body B with regard to horizontal movements of the excited body B occurring both in the plane of and perpendicular to the paper in FIG. 1. For example, if the body B is moved horizontally in the plane of paper in FIG. 1, the first bar 29 remains stationary relative to the excited body and transmits the movements of the body to the second lever 30 to rotate it about the pivot point 36 in the plane of the paper. Likewise, if the excited body B is moved in a horizontal direction perpendicular to the paper in FIG. 1, the first bar 29 again remains stationary relative to the excited body and transmits the motion of the excited body to the lever 30 to rotate it about the pivot point 36 in a plane perpendicular to the paper. In either of these latter two cases, the isolating action of the second lever 30 is similar to that described in the one-dimension system of U.S. Pat. No. 3,322,379. Also, in each of these two cases, the pivot point 36 is the point of connection between the second lever and the isolated body and serves as the reference point for determining its R/r characteristic. As shown, the center of gravity 42 is displaced by the distance $R_2$ in one direction from the pivot point 36 and the other pivot point 38 is displaced the distance $r_2$ in the opposite direction from the pivot point 36 so that the second bar has an R/r characteristic of $-R_2/r$.

The isolators of FIGS. 3 and 4, FIGS. 5 and 6, and FIGS. 7 and 8, except for the relative arrangements of the pivot axes and centers of gravity of the two bars 29 and 30 are similar to that of FIGS. 1 and 2 and need not be redescribed in detail. It should be noted, however, that in each case, the pivot point 38 is the reference point for the determination of the R/r characteristic of the first lever and the pivot point 36 is the reference point for the determination of the R/r characteristic of the second lever. Therefore, from inspection of FIG. 3, it will be noted that the arrangement in the isolator there shown is such that both of the levers 29 and 30 have a positive R/r characteristic. In inspecting FIG. 5, it will be noted that the isolator there shown has such an arrangement that the first lever 29 has a negative R/r characteristic and the second lever 30 a positive R/r characteristic. Similarly, from the inspection of FIG. 7, it will be noted that in the isolator there shown the first lever 29 has a positive R/r characteristic and the second lever 30 has a negative R/r characteristic.

It should, of course, be understood that FIGS. 1 through 8 are of a somewhat schematic form and that an actual isolator made in accordance with this invention may have a considerably different appearance, depending on the nature of the excited and isolated bodies and the nature of the elements used for the weighted levers and the springs. It should also be understood that although in these FIGS. a separate spring has been shown for each of the three orthogonal directions of relative movement, this has been done for clarity of explanation only and in an actual device it may not be necessary to use a separate spring means for elastically separating the two bodies in each of their three directions of relative movement. That is, some spring means are capable of elastic deformation of deflection along two or three orthogonal axes, and if desired, one such a spring may be used in place of two or Three of the individual springs shown in FIGS. 1 to 8. Also, in the arrangement of the spring means, it is preferable, but not necessary, that its elastic center be substantially coincident with the point 36 about which the second lever pivots relative to the isolator body. That is, the origin of the three orthogonal axes, along which the spring means deflects, should be near or coincident with the pivot point 36.

For the purpose of further explanation, FIGS. 9 to 12 show one form of an actual three-dimensional isolator, indicated generally at 40, embodying this invention. In these FIGS., the part 42 is the excited body, equivalent to the body B of FIGS. 1 to 8, and the part 44 is the isolated body, equivalent to the body A of FIGS. 1 to 8. The isolator itself includes a first four-sided hollow frame 46 adapted to be fixed to and moved in unison with the excited body 42, and a second four-sided hollow frame 48 adapted to be fixed to and moved in unison with the isolated body 44. The two frames 46 and 48 are arranged with their central axes at right angles to one another and so that the bottom side 50 of the frame 46 passes through the opening of the frame 48 and so that the top side 52 of the frame 48 passes through the opening of the frame 46. A first weighted lever 54 is pivotally connected to the excited housing 46 by three colinear pins 56, 56 and 58 for pivotal movement relative to the frame 46 about a horizontal axis. A second weighted lever 60 is universally connected to the isolated frame 48 by a spherical bearing 62 and is also connected to the first lever 54 by another spherical bearing 64. One set of two helical compression springs 66, 66 is interposed between the bottom side 68 of the frame 46 and the top side 52 of the frame 48 and another set of two similar helical compression springs 70, 70 is interposed between the top side 52 of the frame 48 and the top side 72 of the frame 46.

In considering the operation of the isolator 40 shown in FIGS. 9 and 12, consider first that the excited body 42 and frame 46 move in a vertical direction relative to the isolated body 44 and frame 48. As a result of this relative movement between the two frames 46 and 48, the first lever 54 is pivoted about the axis provided the pins 56, 56 and 58 and elastic restoring forces resisting such movement are provided by deflection of the springs 66, 66 and 70, 70 along their central axes. The dynamic response is, therefore, substantially similar to that of a one-dimensional isolator such as shown in the aforementioned patent and patent application and the desired isolating effect is achieved.

Assume next that the excited body 42 and frame 46 move in a horizontal direction relative to the isolated body 44 and frame 48 in the plane of the paper in FIG. 11. As the result of this relative movement, the second lever 60 is moved in the plane of the paper by being pivoted relative to the frame 48 about the center of the spherical bearing 62 and by being pivoted relative to the lever 54 about the center of the spherical bearing 64. Elastic restoring forces opposing this movement are provided by deflection of the springs 66, 66 and 70, 70 in directions perpendicular to their central axes. Similarly, if the excited body and frame 46 are moved horizontally in a direction perpendicular to the paper in FIG. 11, the second lever 60 is pivoted in a similar manner but in a plane perpendicular to the paper. In each of the two latter forms of movement, the dynamic response of the second lever 60 is similar to that of the related lever of a one-dimensional isolator and the desired isolating effect is achieved.

Although the drawings show preferred embodiments of the invention which have been described above, it should be understood that various changes may be made from the constructions disclosed, and that the drawings and description are not to be construed as defining or limiting the scope of this invention, the following claims forming a part hereof being relied upon for that purpose.

I claim:

1. The combination with a first body subject to vibrational excitation and a second separate body of a vibration isolator for supporting said second body from said first body while reducing the transmission of vibratory said first and displacements from said first body to said second body resulting from movement of said first body relative to said second body in three orthogonal directions, said vibration isolator including a spring means interposed between said first and second bodies for statically supporting said second body from said first body and for resiliently resisting movement of said first body relative to said second body in three orthogonal directions of relative movement, first and second massive levers, means pivotally connecting said first massive lever to said first body for pivotal movement relative thereto about a pivot axis fixed relative to said first body, means connecting said second lever to said second body for universal movement relative thereto about a point fixed relative to said second body and said second lever, and means connecting said first and second levers to one another for universal movement about a point fixed relative to both of said levers.

2. The combination defined in claim 1 further characterized by said pivot axis, said points of universal connection, and said centers of gravity being so arranged that in one direction of movement of said first body relative to said second body said first lever is moved relative to said first body without said second lever being moved relative to said second body and in other directions of movement of said first body relative to said second body occurring in a plane perpendicular to said one direction said second lever is moved relative to said second body without said first lever being moved relative to said first body.

3. The combination defined in claim 1 further characterized by said first lever having a center of gravity located generally on a line passing through said pivot axis and said point of universal connection between said first and second levers, and said second lever having a center of gravity located generally on a second line passing through said point of universal connection between said second lever and said second body and said point of universal connection between said second lever and said first lever, said first and second lines being generally perpendicular to one another when said first and second bodies are at rest.

4. The combination defined in claim 3 further characterized by the characteristic $R_1/r_1$ being positive and $R_2/r_2$ being positive where:

$R_1 = $ the displacement of the center of gravity of said lever from the point of universal connection between said two levers;

$r = $ the displacement of said pivot axis of said first lever from said points of universal connection between said axis of said two levers;

$R_2 = $ the displacement of the center of gravity of said second lever from its point of universal connection with said second body; and $r_2 = $ the displacement of said point of universal connection between said two levers from said point of universal connection of said second lever to said second body.

5. The combination defined in claim 3 further characterized by the characteristic $R_1/r_1$ being positive and $R_2/r_2$ being negative where:

$R_1 = $ the displacement of the center of gravity of said lever from the point of universal connection between said two levers;

$r_1 = $ the displacement of said pivot axis of said first lever from said points of universal connection between said two levers;

$R_2 = $ the displacement of the center of gravity of said second lever from its point of universal connection with said second body; and $r_2 = $ the displacement of said point of universal connection between said two levers from said point of universal connection of said second lever to said second body.

6. The combination defined in claim 4 further characterized by the characteristic $R_1/r_1$ being negative and $R_2/r_2$ being positive where;

$R_1$ = the displacement of the center of gravity of said lever from the point of universal connection between said two levers;

$r_1$ = the displacement of said pivot axis of said first lever from said points of universal connection between said two levers;

$R_2$ = the displacement of the center of gravity of said second lever from its point of universal connection with said second body; and $r_2$ = the displacement of said point of universal connection between said two levers from said point of universal connection of said second lever to said second body.

7. The combination defined in claim 4 further characterized by the characteristic $R_1/r_1$ being negative and $R_2/r_2$ being negative where:

$R_1$ = the displacement of the center of gravity of said lever from the point of universal connection between said two levers;

$r_1$ = the displacement of said pivot axis of said first lever from said points of universal connection between said two levers;

$R_2$ = the displacement of the center of gravity of said second lever from its point of universal connection with said second body; and $r_2$ = the displacement of said point of universal connection between said two levers from said point of universal connection of said second lever to said second body.

UNITED STATES PATENT OFFICE
CERTIFICATE OF CORRECTION

Patent No. 3,552,694            Dated January 5, 1971

Inventor(s) William G. Flannelly

It is certified that error appears in the above-identified patent and that said Letters Patent are hereby corrected as shown below:

Column 1, line 9, after "3,445,080" insert -- also for Dynamic --. Column 3, line 73, "The" should read -- the --. Column 4, line 18, "$-R_{1/r_1}$" should read -- $-R_1/r_1$ --; line 43 "$-R_{2/r}$" should read -- $-R_2/r$ --. Column 5, line 2, "Three" should read -- three --. Column 6, line 2, "vibratory said fi should read -- vibratory forces --; line 49, "r" should read $r_1$ --; line 50, cancel "axis of".

Signed and sealed this 11th day of May 1971.

(SEAL)
Attest:

EDWARD M. FLETCHER, JR.            WILLIAM E. SCHUYLER,
Attesting Officer                    Commissioner of Patei

PO-1050
(5/69)

UNITED STATES PATENT OFFICE
CERTIFICATE OF CORRECTION

Patent No. 3,552,694      Dated January 5, 1971

Inventor(s) William G. Flannelly

It is certified that error appears in the above-identified patent and that said Letters Patent are hereby corrected as shown below:

On the title page, change the assignee from "Kaman Corporation" to --Kaman Aerospace Corporation--.

Signed and sealed this 30th day of May 1972.

(SEAL)
Attest:

EDWARD M. FLETCHER, JR.
Attesting Officer

ROBERT GOTTSCHALK
Commissioner of Patents